United States Patent [19]
Brix et al.

[11] Patent Number: 5,908,703
[45] Date of Patent: Jun. 1, 1999

[54] ALKALI-FREE ALUMINOBOROSILICATE GLASS AND ITS USE

[75] Inventors: Peter Brix; Ludwig Gaschler, both of Mainz; Thomas Kloss; Gerhard Lautenschlager, both of Jena; Klaus Schneider, Apolda, all of Germany

[73] Assignee: Schott Glaswerke, Germany

[21] Appl. No.: 08/848,239

[22] Filed: Apr. 29, 1997

[30] Foreign Application Priority Data

Apr. 30, 1996 [DE] Germany ............... 196 17 344

[51] Int. Cl.⁶ .................................................. B32B 17/00
[52] U.S. Cl. .............................. 428/426; 428/98; 501/66; 501/67; 349/158
[58] Field of Search ................ 501/66, 67; 349/158; 428/426, 98; 345/55, 76, 87

[56] References Cited

U.S. PATENT DOCUMENTS

| | | | |
|---|---|---|---|
| 3,496,401 | 2/1970 | Dumbaugh, Jr. .............. | 501/70 |
| 5,489,558 | 2/1996 | Moffatt et al. ............... | 501/69 |
| 5,508,237 | 4/1996 | Moffatt et al. ............... | 501/69 |
| 5,736,476 | 4/1998 | Watzke ....................... | 501/67 |

FOREIGN PATENT DOCUMENTS

| | | |
|---|---|---|
| 2058210 | 7/1972 | Germany . |
| 1338386 | 11/1970 | United Kingdom . |

OTHER PUBLICATIONS

Abstract of DE 2,058,210.
Abstract of DE 4,325,656.
Abstract of JP 2,133,334.
Dialog Service of CA 2,143,035.

*Primary Examiner*—Timothy M. Speer
*Attorney, Agent, or Firm*—Millen, White, Zelano & Branigan P.C.

[57] ABSTRACT

Described is an alkali-free aluminoborosilicate glass with a viscosity of $10^{13}$ dPas at a temperature of above 700°0 C., a processing temperature $V_A$ of less than 1220°0 C., and very good chemical stability, which can be produced in a float unit and has the following composition, in % by weight based on oxide:

| | | | |
|---|---|---|---|
| $SiO_2$ | 48 | — | <55 |
| $B_2O_3$ | 7 | — | 15 |
| $Al_2O_3$ | >20 | — | 26 |
| MgO | 0 | — | 8 |
| CaO | 4 | — | 12 |
| BaO | 0 | — | 2 |
| SrO | 0 | — | 2 |
| ZnO | 1 | — | 8 |
| $ZrO_2$ | 0 | — | 2 |
| $SnO_2$ | 0.5 | — | 2 |

The glass is especially suitable for use in display technology.

9 Claims, No Drawings

ALKALI-FREE ALUMINOBOROSILICATE GLASS AND ITS USE

The invention includes an alkali-free aluminoborosilicate glass for use in display technology, which can be produced with good quality by the float process.

BACKGROUND OF THE INVENTION

The requirements of a glass that is to be used in display technology, e.g., as a screen for a flat display, have been described in detail by W. H. Dumbaugh, P. L. Bocko and F. P. Fehlner ("Glasses for Flat-Panel Displays" in "High-Performance Glasses," edited by M. Cable and J. M. Parker, Blackie and Son Limited, Glasgow and London, 1992). The glasses that are available at this time for such uses are also listed in the article "Advanced Glass Substrates for Flat Panel Displays" by J. C. Lapp, P. L. Bocko and J. W. Nelson, Corning Research 1994.

Glasses that are to be used as substrates in LCDs (Liquid Crystal Displays), AMLCDs (Active Matrix Liquid Displays), TFELDs (Thin-Film Electroluminescent Displays) or PDPs (Plastic Display Panels) must have good resistance to thermal shock and good chemical stability with regard to reagents that are used in the production process of flat displays, and must be matched to the polycrystalline silicon as regards their thermal expansion behavior. In addition, these glasses should be as alkali-free as possible to keep integrated circuits, which can be placed directly on the glass substrate, from being "contaminated" by diffusing alkali ions. In this case, production-related proportions of sodium oxide can be tolerated up to a content of 1,000 ppm in the glass.

The glass panes that are suitable for the production of flat displays must have good dimensional stability at temperatures that occur in the production process, low shrinkage (compaction), and very good quality with regard to the absence of crystalline inclusions, knots, and bubbles.

Necessary properties of glasses for flat display uses are thus:

a thermal expansion coefficient $\alpha_{20/300}$ of about $3.7 \times 10^{-6}$/K (for matching to polycrystalline silicon)

a viscosity of $10^{13}$ dPas at a temperature of above 700° C. (for low compaction)

good chemical stability low tendency toward devitrification.

The above-mentioned requirements are basically met by a commercially available glass (V1) which, according to an analysis, has approximately the following composition (in % by weight based on oxide): $SiO_2$ 57.7; $B_2O_3$ 8.4; $Al_2O_3$ 16.4: MgO 0.8; CaO 4.2; SrO 2.0; BaO 9.5; $As_2O_3$ 1.0. This glass is produced according to a special "overflow-fusion" process, which ensures the fabrication of thin glasses with high surface quality. The glasses that are suitable for this process, however, should exhibit only an extremely slight tendency toward crystallization, i.e., the liquidus temperature (any crystals that form dissolve again above this temperature) must lie considerably below the processing temperature $V_A$ (temperature for viscosity at $10^4$ dPas). This may also be the main reason for the very high $V_A$ value of this glass of >1,300° C. The higher $V_A$ is, however, the faster the corrosion of the refractory materials advances, and the higher the primary energy costs in the gas production from the mixture.

Another drawback of the above-mentioned glass VI is the high proportion of arsenic oxide, which obviously is necessary as a refining agent for ensuring the required freedom from bubbles with the selected production process.

Apart from the fact that owing to the toxicity of arsenic oxide it is prudent to avoid the use of these glass components, the presence of arsenic oxide leads to the fact that such glasses cannot be drawn on a float unit since the reductive conditions that are present here (liquid tin, reductive protective gas atmosphere, generally forming gas) lead to precipitation of metallic arsenic, which imparts an undesirable gray hue to the glasses, making them unusable.

In U.S. Pat. No. 3,496,401, glass composition ranges (% by weight based on oxide) that are similar to the composition of glass V1 are indicated for halogen light bulbs: $SiO_2$ 55–70; $B_2O_3$ 0–10 ; $Al_2O_3$ 13–25 ; alkaline-earth oxides 10–25 . No indications are given regarding refining, however. The thermal expansion values of these glasses are low; the temperatures for the viscosity of $10^{13}$ dPas are high. Their chemical stability is not described.

Japanese laid-open specification J 2-133 334 A describes alkali-free glasses for electronic components, which have good thermal stability, chemical stability, and optical homogeneity and have the following composition ranges (% by weight based on oxide): $SiO_2$ 54–60; $B_2O_3$ 6–10; $Al_2O_3$ 10–15 ; MgO 0–2 ; CaO 8–15 ; BaO 4–10 ; ZnO 1–6 ; $TiO_2$ and/or $ZrO_2$ 0.3–4.

European laid-open specification EP 0 672 629 A2 describes aluminosilicate glasses for flat displays. It shows various composition ranges with various thermal expansion coefficients and different qualities relative to acid stability, which all require relatively large amounts of alkaline-earth oxides.

German laid-open specification DE-AS 20 58 210 describes borosilicate glasses that have separate phases and contain at least 55–70% by weight of $SiO_2$, 1–8.3% by weight of $B_{2\,O3}$, 7–23% by weight of $Al_{2\,O3}$, and 6.7–16.5% by weight of MgO. These components ensure phase separation using heat treatment.

SUMMARY OF THE INVENTION

An object of this invention is to find a transparent glass for use in display technology, which has a thermal expansion coefficient $\alpha_{20/300}$ of about $3.7 \times 10^{-6}$/K, a temperature at the viscosity of $10^{13}$ dPas of above 700° C., and a processing temperature $V_A$ of less than 1,220° C., has very good chemical stability, and is basically free of alkali oxides. In addition, it is to be free of readily reductive components and thus can be produced on a float unit.

This object is achieved by the glass as is described herein.

Upon further study of the specification and appended claims, further objects and advantages of this invention will become apparent to those skilled in the art.

The glass contains relatively little $SiO_2$, namely 48 to <55% by weight. In the case of still smaller proportions, thermal expansion α increases to a high value and the good hydrolytic stability deteriorates; at higher proportions, $V_A$ increases to a high value, and the glass is more difficult to process. The range of from 49 to 53% by weight is therefore preferred.

The good chemical stability and high devitrification stability are promoted by the high $Al_2O_3$ content of >20 to 26% by weight. Only above 26% by weight does $V_A$ rise too much and increase the tendency toward phase separation. Starting from 20% by weight and less, devitrification stability and the temperature of the $10^{13}$ dPas viscosity decrease greatly. The range is preferably from >20 to 24% by weight.

In a co-pending U.S. application (Ser. No. 08/791,949, filed Jan. 31, 1997), a glass of a similar composition is described. It is distinguished from the glass according to the invention at least by its higher $SiO_2$ content (52–62% by weight) and its lower proportion of $Al_2O_3$ (12–20% by weight). In comparison to that glass, the glass that is described in this application has a higher devitrification stability and a lower processing temperature $V_A$ while maintaining the desired thermal expansion and high chemical stability.

As a fluxing agent for facilitating meltability, $B_2O_3$ is used at a proportion of at least 7% by weight in the alkali-free glasses according to the invention for the above-described reason. A high proportion of boron oxide is also desirable for good chemical stability and devitrification stability, as well as for electrical insulating ability. The melt's attack on the refractory materials is also reduced. The proportion of $B_2O_3$ must not be more than 15% by weight, however, since otherwise the temperature for the $10^{13}$ dPas viscosity no longer reaches the desired high value. The range between 9 and 13% by weight is preferred.

The good chemical stability of the glass is indicated by the data in the Table. For example, the hydrolytic resistance according to ISO 719, of for example, 10–14 $\mu$g of $Na_2O/g$ is considered a "very high resistant glass"; see Schott, TECHNICAL GLASSES: Physical and Chemical Properties, ed. 1990, Mainz, Germany.

The alkaline-earth oxides also raise the temperature for the $10^{13}$ dPas viscosity. The glass therefore contains 4 to 12% by weight of CaO (preferably 6–11% by weight), 0–8% by weight of MgO (preferably 0–6% by weight); 0–2% by weight of SrO (preferably 0–1% by weight), and 0–2% by weight of BaO (preferably 0–1% by weight). This low proportion of BaO enhances the desired low density of the glasses. Owing to the considerable toxicity of all soluble barium compounds, certain precautionary measures are taken in the batch house and during heat processing to adhere to the maximum permissible concentration value. This makes it even more advantageous that in a preferred embodiment of the invention, the addition of this component can be rendered completely unnecessary.

Preferably, the overall proportion of MgO, CaO, SrO and BaO is limited to <12% by weight since at higher proportions the tendency toward devitrification increases and $\alpha_{20/300}$ increases to a high value.

In an especially advantageous embodiment of the invention, the two components MgO and CaO are introduced via dolomite, which simplifies the logistics of the mixture preparation. With the molar ratio of about 1:1 that is thus given, the weight ratio of CaO/MgO is about 1.4.

Further, the glass according to the invention contains 1–8% by weight (preferably 2–6% by weight) of ZnO and 0–2% by weight of $ZrO_2$.

$ZrO_2$ has a positive effect on chemical stability. Owing to its poor solubility, its proportion, however, should not exceed 2% by weight since otherwise, melt relics, so-called zirconia stones, are unavoidable in the finished glass.

An especially preferred glass composition mixture in which, owing to the weighed combination of the components, the properties of the glasses according to the invention are combined especially advantageously, is represented by the following range (in % by weight based on oxide): $SiO_2$ 50–52; $B_2O_3$ 10.5–12; $Al_2O_3$ 20–22.5; MgO 0–5.5; CaO 6–10; BaO 0–1; ZnO 2–3; $ZrO_2$ 0–2; $SnO_2$ 0.5–1.5.

For the reason that is already mentioned above (reduction to elementary arsenic), no arsenic oxide can be used for the refining of glasses that are processed after the actual melting process in a float unit. The same applies to antimony oxide, which is otherwise frequently used as an alternative.

Common salt, which is often used in alkali oxide-containing melts and contributes to refining by its evaporation, which starts at about 1,410° C., represents another standard refining agent, whereby a portion of the sodium chloride that is used is found again in the glass in the form of sodium oxide; since display glasses are to be as alkali-free as possible, however, it is also not possible to use this refining agent here.

Alkaline-earth chlorides, of which especially barium chloride has proven effective, also remain as suitable refining agents since they have a refining potential that is similar to that of common salt. The boiling temperature, which is about 150° C. higher, however, also requires correspondingly higher melting temperatures. Another drawback of these components is the considerable toxicity of all soluble barium compounds that has already been mentioned.

It has now been found, surprisingly enough, that when 0.5 to 2% by weight of tin oxide (preferably 0.5–1.5% by weight) is used as a refining agent, a glass quality that is comparable to that resulting from arsenic refining can be achieved. The quadrivalent tin oxide $SnO_2$, which is kept in a mixture in this oxidation stage by the addition of nitrate, is used in this case. At the high temperatures that prevail in the refining portion of the melting tray, the tin ions shift partially into the divalent state, whereby the oxygen bubbles that are formed rise and thus contribute to the refining by virtue of the fact that gases that are dissolved in the melt diffuse into these bubbles and are thus removed from the glass. Very small bubbles that have not risen are resorbed again at the end of the refining phase, i.e., at low temperatures, by the tin monoxide SnO which is now present and in this case oxidizes again into $SnO_2$.

Another advantage when $SnO_2$ is used as a refining agent consists in the fact that the diffusion of tin from the float bath into the glass surface is reduced since the difference in concentration as a driving force of diffusion is smaller in the case of tin-containing glasses.

The nitrate for stabilizing the quadrivalent tin ions can be introduced by various glass components: e.g., as $Ba(NO_3)_2$ or if, as described as a preferred embodiment, BaO is rendered unnecessary, as $Mg(NO_3)_2$, $Ca(NO_3)_2$, $Al(NO_3)_3$, for example.

The glasses according to the invention are extremely well suited for use as substrate glasses in display technology.

Besides the fact that they all have the properties that are necessary for flat display applications, the glasses according to the invention have the following special advantages.

They can be produced on a float unit since they are free of readily reduceable components. Because no $As_2O_3$ is used in the refining, from the standpoint of environmental protection there is also the advantage that BaO does not need to be used as a glass component. The glasses have a low processing temperature, which saves energy and money during production.

The glasses have very high chemical stability and have only a very slight tendency toward devitrification.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding German application No. 196 17 344.2, filed Apr 30, 1996, is hereby incorporated by reference.

EXAMPLES

The table shows five glasses according to the invention with their compositions and their properties that are indicative of to the invention. The compositions are given in terms of the final glass product.

The glasses were smelted from conventional raw materials in quartz crucibles at 1,620° C.; the melt was refined for one and a half hours at this temperature, cast into inductively heated platinum crucibles, and stirred for 30 minutes at 1,550° C. for homogenization.

TABLE

Glass Composition (in % by Weight Based on Oxide) and Properties of the Glasses

|  | 1 | 2 | 3 | 4 | 5 |
|---|---|---|---|---|---|
| $SiO_2$ | 51.6 | 51.6 | 51.6 | 51.6 | 51.6 |
| $B_2O_3$ | 11.4 | 11.4 | 11.4 | 11.4 | 11.4 |
| $Al_2O_3$ | 21.0 | 21.0 | 21.5 | 21.0 | 21.0 |
| MgO | 2.0 | 4.6 | 2.0 | 4.2 | 1.5 |
| CaO | 9.0 | 6.4 | 9.0 | 5.8 | 8.5 |
| BaO | 1.0 | 1.0 | — | 1.0 | 1.0 |
| ZnO | 2.0 | 2.0 | 2.5 | 2.5 | 3.0 |
| $ZrO_2$ | 1.0 | 1.0 | 1.0 | 1.5 | 1.0 |
| $SnO_2$ | 1.0 | 1.0 | 1.0 | 1.0 | 1.0 |
| $\alpha_{20/300}$[1] $[10^{-6}/K]$ | 3.71 | 3.61 | 3.66 | 3.65 | 3.64 |
| $T_g$[2] [°C.] | 700 | 701 | 700 | 701 | 697 |
| temperature for $10^{13}$-dPas viscosity [°C.] | 709 | 711 | 723 | 709 | 707 |
| temperature for $10^{7.6}$-dPas viscosity [°C.] | 903 | 905 | 914 | 905 | 903 |
| temperature for $10^4$-dPas viscosity [°C.] | 1198 | 1205 | 1198 | 1198 | 1202 |
| density [$10^3$ kg/m$^3$] | 2.526 | 2.527 | 2.521 | 2.528 | 2.530 |
| compaction[3] [ppm] | −5 | −5 | −5 | −6 | −8 |
| hydrolytic stability according to ISO 719 [μg $Na_2O$/g] | 12 | 13 | 10 | 14 | 10 |
| $H_2O$[4] [mg/cm$^2$] | 0.03 | 0.03 | 0.02 | 0.03 | 0.02 |
| 5% HCl[5] [mg/cm$^2$] | 0.21 | 0.25 | 0.18 | 0.20 | 0.18 |
| 5% NaOH[6] [mg/cm$^2$] | 0.73 | 0.68 | 0.64 | 0.66 | 0.70 |
| 10% $NH_4$F-HF[7] [mg/cm$^2$] | 0.08 | 0.10 | 0.06 | 0.09 | 0.10 |
| liquidus temperature [°C.] | 1250 | 1250 | 1250 | 1245 | 1245 |
| $V_{max}$[8] [μm/h] | 11 | 16 | 14 | 15 | 10 |

[1] Thermal expansion in the temperature range of 20 to 300° C.
[2] Dilatometric glass transformation temperature according to DIN 52324
[3] Shrinkage after the glass is tempered at 400° C. for one hour
[4] Weight loss after small polished glass plates (70 mm × 50 mm × 2 mm) are treated in water for 24 hours at 95° C.
[5] Weight loss after small polished glass plates (70 mm × 50 mm × 2 mm) are treated in 5% hydrochloric acid for 24 hours at 95° C.
[6] Weight loss after small polished glass plates (70 mm × 50 mm × 2 mm) are treated in 5% sodium hydroxide solution for 6 hours at 95° C.
[7] Weight loss after small polished glass plates (70 mm × 50 mm × 2 mm) are treated in 10% $NH_4$F—HF solution for 20 minutes at 20° C.
[8] Maximum observed length of growth of the crystals that are formed. When the growth rate of crystals v is plotted versus temperature T, the maximum crystal growth rate $V_{max}$ corresponds to the growth rate at temperature $KG_{max}$. The smaller $V_{max}$ is, the less crystalline volume is formed. $V_{max}$ is thus a parameter for the tendency toward crystallization (tendency toward devitrification).

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. An alkali-free aluminoborosilicate glass with the following composition, in % by weight based on oxide:

| $SiO_2$ | 48 | — | <55 |
|---|---|---|---|
| $B_2O_3$ | 7 | — | 15 |
| $Al_2O_3$ | >20 | — | 26 |
| MgO | 0 | — | 8 |
| CaO | 4 | — | 12 |
| BaO | 0 | — | 2 |
| SrO | 0 | — | 2 |
| ZnO | 1 | — | 8 |
| $ZrO_2$ | 0 | — | 2 |
| $SnO_2$ | 0.5 | — | 2. |

2. The aliminoborosilicate glass of claim 1, which has a viscosity of $10^{13}$ dPas at a temperature which is above 700° C., has a processing temperature $V_A$ of less than 1220° C., and is produceable by a float glass process.

3. An aluminoborosilicate glass according to claim 1 with a composition, in % by weight based on oxide, of:

| $SiO_2$ | 49 | — | 53 |
|---|---|---|---|
| $B_2O_3$ | 9 | — | 13 |
| $Al_2O_3$ | >20 | — | 24 |
| MgO | 0 | — | 6 |
| CaO | 6 | — | 11 |
| BaO | 0 | — | 1 |
| SrO | 0 | — | 1 |
| ZnO | 2 | — | 6 |
| $ZrO_2$ | 0 | — | 2 |
| $SnO_2$ | 0.5 | — | 1.5. |

4. An aluminoborosilicate glass according to claim 1, wherein the total amount of MgO, CaO, BaO and SrO in the glass is <12% by weight.

5. An aluminoborosilicate glass according to claim 1, wherein the glass is free of BaO, with the exception of unavoidable contaminants.

6. An aluminoborosilicate glass according to claim 1, having the following composition, in % by weight based on oxide:

| $SiO_2$ | 50 | — | 52 |
|---|---|---|---|
| $B_2O_3$ | 10.5 | — | 12 |
| $Al_2O_3$ | >20 | — | 22.5 |
| MgO | 0 | — | 5.5 |
| CaO | 6 | — | 10 |
| BaO | 0 | — | 1 |
| ZnO | 2 | — | 3 |
| $ZrO_2$ | 0 | — | 2 |
| $SnO_2$ | 0.5 | — | 1.5. |

7. An aluminoborosilicate glass according to claim 1, wherein the molar ratio CaO:MgO is about 1.

8. A display with a glass screen, wherein the glass is an aluminoborosilicate glass according to claim 1.

9. The display of claim 8, wherein the display is a flat panel display.

* * * * *